Sept. 6, 1966     K. KATZ ET AL     3,270,744
CRYOGENIC SURGICAL PROBE
Filed Nov. 27, 1963     3 Sheets-Sheet 2
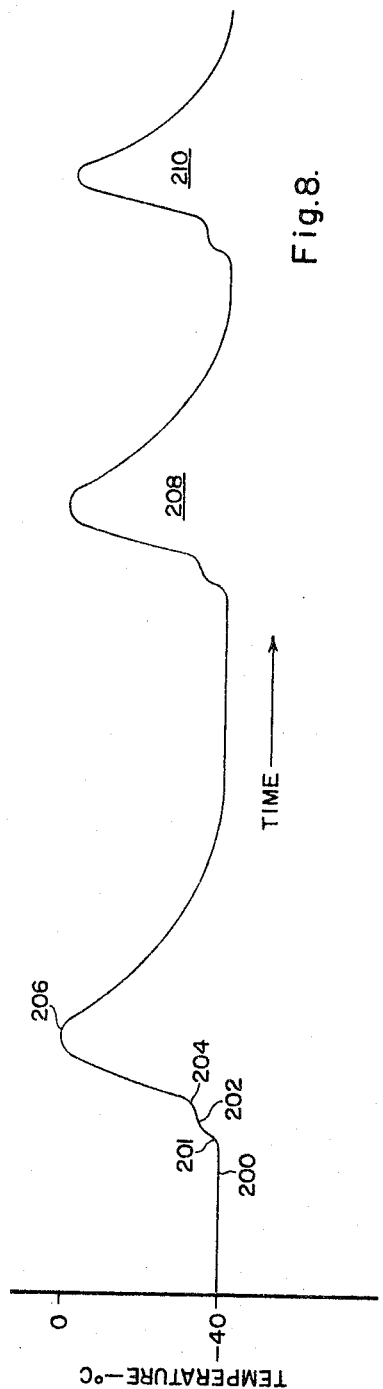
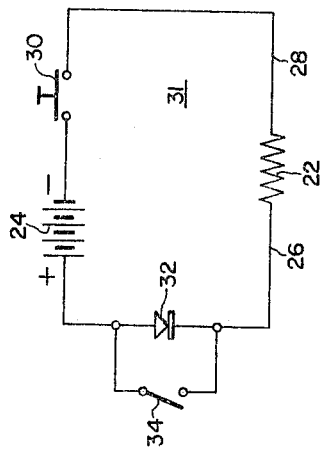
INVENTORS
Edward F. Federmann, Kurt Katz
and Anthony J. Venturino
BY Donald P. Lackey
ATTORNEY Sept. 6, 1966  K. KATZ ET AL  3,270,744
CRYOGENIC SURGICAL PROBE Filed Nov. 27, 1963  3 Sheets-Sheet 3

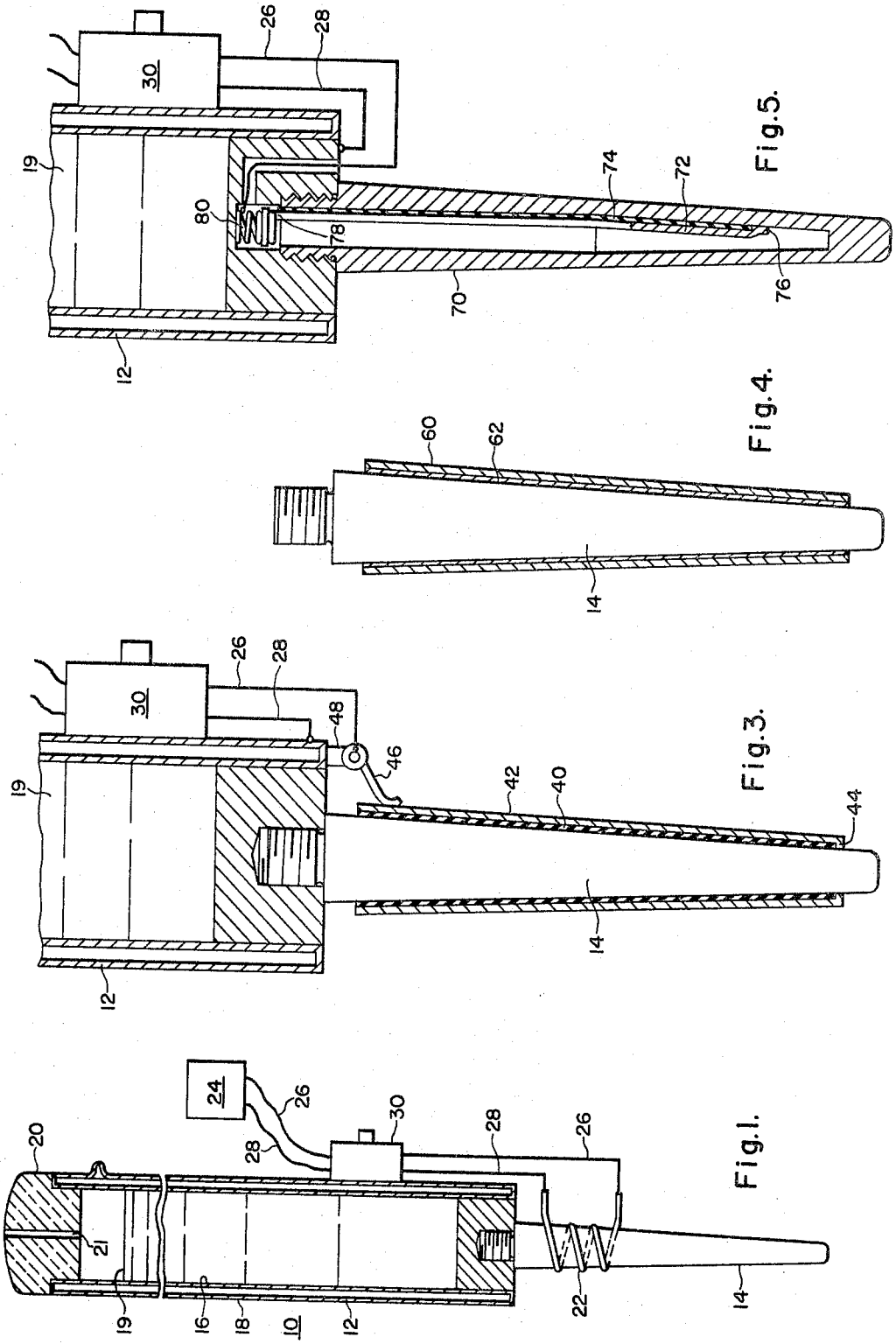

United States Patent Office 3,270,744
Patented Sept. 6, 1966

3,270,744
CRYOGENIC SURGICAL PROBE
Kurt Katz, Pittsburgh, and Edward F. Federmann and Anthony J. Venturino, Penn Hills, Pa., assignors to Westinghouse Electric Corporation, Pittsburgh, Pa., a corporation of Pennsylvania
Filed Nov. 27, 1963, Ser. No. 326,550
3 Claims. (Cl. 128—303.1)

This invention relates in general to surgical probes and more particularly to surgical probes which utilize cryogenic techniques.

In the field of eye surgery, and other surgical areas, it is often necessary that a probe be used which utilizes cryogenic techniques to produce a cold tip which is capable of attaching itself to a specific object and detaching itself from the object at the will of the surgeon. For example, in cataract surgery, it is necessary that a probe be used which will effectively attach itself to the lens of the eye, and detach itself when required by the surgeon, without risk of rupturing the eye capsule. There are many other uses for a cryogenic surgical probe, for example, a probe with a cold tip may be used to lessen or stop the flow of blood during surgical operations, tonsil removal, tumors may be frozen, eye retinas may be attached, as well as many applications in the field of animal surgery. The probe must be delicately light, small, and easily manipulated or handled by the surgeon. When cryogenic techniques are utilized, whereby the probe tip is rendered sufficiently cold to freeze objects, or to cause objects to instantly attach themselves to the probe due to freezing, it is desirable that the coolant supply be contained in the probe itself, making unnecessary a bulky supply line. Further, fast effective means must be utilized to warm the probe tip to free attached objects, at the will of the surgeon or user.

Accordingly, it is a general object of this invention to provide a new and improved surgical probe.

Another object of this invention is to provide a new and improved surgical probe which utilizes cryogenic techniques.

A further object of this invention is to provide a new and improved surgical probe which has a self-contained coolant supply for cooling the tip end of the probe.

Still another object of this invention is to provide a new and improved surgical probe in which the probe tip is cooled by cryogenic techniques and also contains apparatus for warming the probe tip when desired.

Another object of the invention is to provide a new and improved surgical probe in which the probe tip may be mechanically separated from the coolant means to effect warming of the probe tip when desired.

A further object of this invention is to provide a new and improved cryogenic surgical probe in which the tip is heated by electrically responsive heating means.

Briefly, the present invention accomplishes the above cited objects by providing a surgical probe comprising a vacuum insulated body portion having a compartment or chamber to which coolant means may be added, similar to a Dewar vessel, and a probe tip which is detachably disposed in thermal communication with the body portion. The body portion of the probe is large enough to contain a supply of coolant means sufficient to last the duration of the surgery, such as liquid nitrogen, but yet is small enough that it can be easily and delicately handled, thus providing the surgeon with the required sensitivity. One embodiment of the invention utilizes a probe tip that has electrically responsive heating means disposed in thermal communication with said tip, such as an electrically heated wire or resistive coating, which may be actuated by a foot switch, or a pushbutton mounted on the body portion of the probe. The power supply for the heating means may be a small battery, which may conveniently be placed in the surgeon's pocket or other suitable location, and thus presents no difficulty from the portability standpoint. Another embodiment of the invention effects warming of the probe tip by mechanically separating the vessel containing the coolant means from the probe tip. This mechanical separation may be accomplished by merely moving a slide button on the side of the probe.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 is an elevational view, in section, showing a cryogenic surgical probe constructed according to the teachings of one embodiment of this invention;

FIG. 2 is a schematic diagram illustrating an electrical circuit which may be used to warm the probe tip;

FIG. 3 is an enlarged elevational view, in section, of the probe tip shown in FIG. 1, illustrating another embodiment of the invention utilizing electrically responsive heating means;

FIG. 4 is an enlarged elevational view, partly in section, of a probe tip, illustrating another embodiment of the invention which uses electrical means for warming the probe tip;

FIG. 5 is an enlarged elevational view, in section, of a probe tip illustrating another arrangement utilizing electrical means for heating the probe tip;

FIG. 8 is a time-tempearture graph illustrating the reproducibility of probe tip tempearture.

Figure 6:
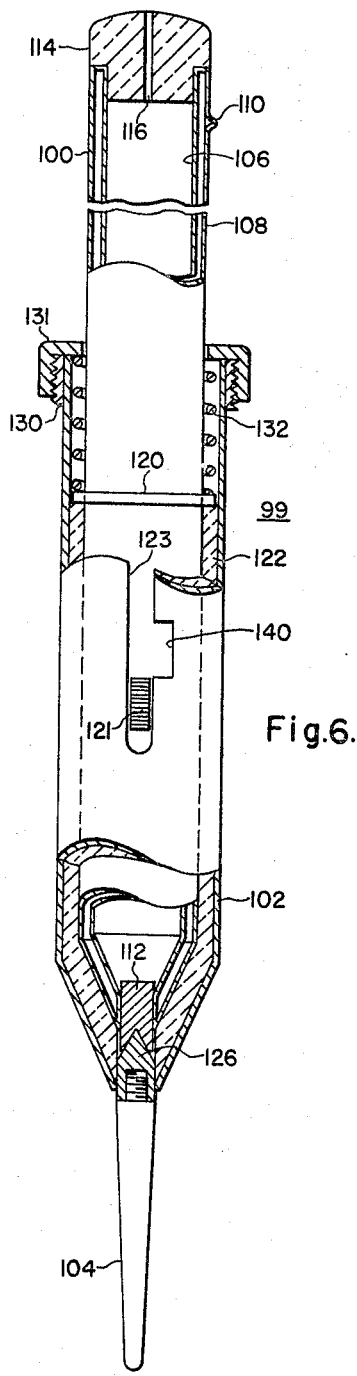
FIG. 6 is an elevational view, partially in section, showing a cryogenic surgical probe constructed according to the teachings of another embodiment of the invention.

Referring now to the drawings, and FIG. 1 in particular, there is shown an elevational view, in section, of a probe 10 constructed according to the teachings of one embodiment of this invention. More specifically, the probe 10 may be constructed in two major parts, the probe body 12 and the probe tip 14. As illustrated, the probe tip 14 is detachably mounted to one end of the probe body 12, such as by screw threads, to allow the probe tip 14 to be easily and quickly changed.

The body portion 12 of the probe 10 may be constructed similar to a Dewar vessel having inner and outer walls 16 and 18 respectively, with a vacuum between the inner and outer walls 16 and 18 for insulating purposes. It should be noted, however, that the lower end of body portion 12 is not thermally insulated. Stainless steel has been found to be an excellent material for constructing the body portion 12, however, other suitable materials may be used.

The chamber or compartment formed by the inner wall 16, should be capable of holding a supply of coolant means 19, such as liquid nitrogen, which will keep the probe tip 14 at the desired low temperature for the duration of the intended usage. A top or cap 20 having a suitable vent 21 to allow vaporized coolant to escape may be used to thermally seal the enclosure after coolant 19 has been added to the probe 10. The cap 20 may be formed of teflon, or other suitable insulating material.

The exact dimensions of the probe body 12 and probe tip 14, and type of coolant means 19, will depend upon the intended usage of the probe and the temperature desired to be maintained at the probe tip 14. For example, in cataract eye surgery, an operation which requires only two to three minutes, a probe body 12 having walls 16 and 18 constructed of 10 mil stainless steel, an overall length of 6 inches, and outside diameter of .5 inch and an inside diameter of .375 inch was found to be suitable. Utilizing a probe tip 14 having an overall length of 1½ inches, .2 inch wide at the top and .06 inch wide at its tip end, and liquid nitrogen as the coolant means 19, the point of the probe tip 14 can be maintained at a temperature of approximately −20° C. for ten minutes.

For other applications requiring different probe tip temperatures, it is merely necessary to change to a tip having different dimensions and/or a coolant having a different temperature than liquid nitrogen may be used. Also, the vessel size may be increased or decreased to keep the probe tip at the desired temperature for the required length of time.

It is not sufficient, however, to merely provide a small, delivate cryogenic probe which will develop a desired low temperature at the point of the probe tip 14. The success of the probe 10 depends upon being able to raise the temperature of the point of the probe tip 14 quickly when desired. The raise in temperature of the probe tip 14 to the desired temperature should be in the order of 1 to 3 seconds maximum, so as not to unduly delay critical surgery.

FIG. 1 illustrates one method for rapidly raising the temperature of the probe tip 14, utilizing heat developed by the flow of electricity through an electrical conductor having a certain resistance. A resistor or conductor of electricity 22 having a predetermined resistance, is disposed in thermal communication with the probe tip 14. The electric circuit from resistor 22 being completed to a source of potential 24 through conductors 26 and 28. Switching means or pushbutton 30, suitably disposed on the side of body portion 12 of the probe 10, or a foot acauated switch (not shown), connects the source of potential 24 to the resistor 22 when actuated. As illustrated, the pushbutton 30 is conveniently mounted to allow finger tip control. Thus, the user may easily actuate the pushbutton with the same hand that is handling the probe 10.

The source of potential 24 may be a battery having the desired potential output, such as a nickel-cadmium battery, or any other suitable type. A 1.2 volt nickel-cadmium battery weighing approximately 8 ounces and small enough to easily slip into the user's pocket has been found to give excellent results. The value of resistor 22 may be selected to allow the proper current flow and heating effect for the magnitude of potential used.

A schematic diagram of an electric circuit 31, which may be used with the probe 10 shown in FIG. 1 is illustrated in FIG. 2, with like components designated with designed to produce the desired heating effect at a potential less than the potential of the battery 24, voltage dropping means, such as a diode 32 may be connected in series circuit relation with the battery 24, pushbutton 30, and resistor 22. If diode 32 is not required for any reason, such as a low charge on the battery 24, a switch 34 may be used to short the diode 32 from the circuit.

FIGS. 3, 4 and 5 show other embodiments of the invention, illustrating different ways of electrically heating the probe tip 14. FIG. 3 illustrates a probe tip 14 with a coating of electrical insulating material 40, such as an oxide film, deposited over a predetermined area of the outside surface of probe tip 14, with a layer of conducting material 42, such as copper, deposited or plated over the insulating film 40. The conducting material 42 may contact the probe tip 14 at point 44. Thus, when probe 14 is attached to the probe body 12, spring mechanism 46, or any other suitable means, may be manually actuated to press against the conducting material 42 and complete an electrical circuit between the spring mechanism 46 and the conducting material 42. The spring mechanism 46 may be insulatingly attached to the probe body 12 through insulator 48, with one lead or conductor 26 from the pushbutton 30 and source of potential (not shown) being connected to spring mechanism 46. The remaining conductor 28 from the pushbutton 30 and source of potential may be connected directly to the casing of body portion 12. Thus, when the pushbutton 30 is actuated, an electric circuit is completed from conductor 26, through spring mechanism 46, through conducting material 42 to the probe tip 14 at point 44, and through the probe tip 14 to the body portion 12 and conductor 28.

An alternative construction of the needle or probe tip 14 is shown in FIG. 4. This embodiment utilizes a coating 60 having a relatively high electrical conductivity, such as copper, disposed over a coating of resistive material 62 which is in close thermal communication with the probe tip 14. The resistive material 62 may be any of the higher resistive metals, carbon, silicon carbide, etc., of the proper thickness to produce the desired voltage drop, thus making auxiliary voltage dropping devices unnecessary. Thus, when the probe tip 14, as shown in FIG. 4, is attached to a body portion 12, such as shown in FIG. 3, the spring mechanism 46 will make contact with the electrically conducting coating 60. The electric circuit is then completed through the resistive material 62 and probe tip 14 by actuating push-button 30 as hereinbefore described relative to FIG. 3.

FIG. 5 illustrates another embodiment of the invention wherein a hollow probe tip 70 is utilized with an electrically heated wire 72 disposed in the center of the tip 70. The probe tip 70 is shown being open at one end and closed at the other, but it is not to be so limited. Suitable tips could also be designed in which both ends of the probe tip 70 are open. The wire 72 may be electrically insulated from the probe tip 70 by an oxide 74, or other suitable electrical insulating material which is a thermal conductor, except at point 76 where the wire 72 makes electrical contact with the probe tip 70. The wire 72 may have an upper extension 78 which automatically makes electrical contact with the auxiliary electrical circuit when attached to body portion 12 through a conducting ring and spring arrangement 80. Conductor 26 may then be connected to the ring and spring arrangement 80 and the electrical circuit from the source of potential may be completed through pushbutton 30 and conductor 28 to the casing of body portion 12. It is also to be understood that other heating means, such as shown in FIGS. 3 and 4, could also be disposed in the center of tip 70.

Figure 7:
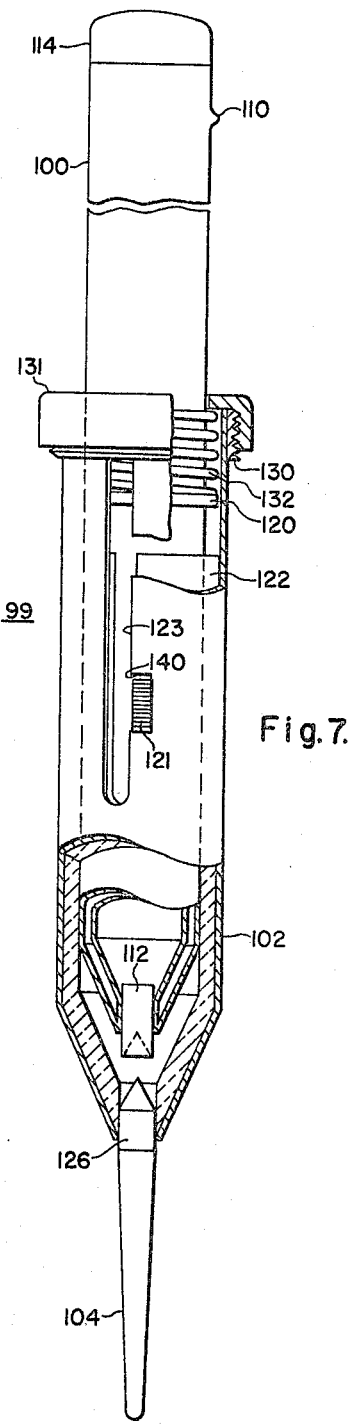
FIG. 7 is an elevation view of the probe shown in FIG. 6, illustrating a different position of the probe components.

FIGS. 6 and 7 are elevational views of a cryogenic surgical probe 99 which illustrate an embodiment of the invention which is entirely mechanical. Broadly, the embodiment illustrated in FIGS. 6 and 7 depends upon mechanical separation of the coolant supply from the probe tip to provide instant warming of the probe tip when desired. The temperature of the probe tip increases rapidly from its very low temperature when the coolant supply is not in thermal communication with it. FIG. 6 illustrates the probe portion when it is desired to cool the probe tip, with the coolant supply in pressure contact with the probe tip. FIG. 7 illustrates the probe position when it is desired to warm the probe tip, with the probe tip separated from the coolant supply.

More specifically, the medical probe shown in FIGS. 6 and 7 comprises a flask or vessel member 100, an outer sleeve member 102 and a probe tip or needle 104 which may be detachably mounted to the outer sleeve member 102, such as by screw threads, to allow the probe tip to be easily and quickly changed. The flask member may have inner and outer walls 106 and 108, respectively, with a vacuum between said inner and outer walls 106 and 108, for insulating purposes. A vacuum "seal off" 110 is shown near the top of the vessel 100. The vessel member 100 terminates at one end with a contact block of metal 112 having high thermal conductivity.

The chamber formed by inner wall 106 should be sized to hold a supply of liquid cooling means, such as liquid nitrogen, which will keep probe tip 104 at a predetermined low temperature for the duration of the intended usage. After liquid coolant has been added to the vessel 100, a cap 114, having a vent 116, may be inserted into the upper end of the vessel 100. The vessel 100 also has a spring retaining ring 120 and button 121 attached to the outer side 108 thereof at predetermined locations, whose purposes will be explained hereinafter. The vessel 100 is telescoped into sliding engagement with outer sleeve member 102, with member 102 having a slot 123 for receiving button 121. Outer sleeve member 102 provides the "grip" for the probe, and may be constructed of any suitable material such as stainless steel. Sleeve member 102 is thermally insulated from the vessel 100 by a layer of thermal insulating material 122, such as teflon. Insulating layer 122 also has the function of providing an air seal, keeping air and moisture from the contact block 112, thus preventing ice formation which would be detrimental to the operation of the probe. The lower portion of outer sleeve member 102 has a contact block 126, which mates with the contact block 112 disposed on the lower end of vessel 100. Contact block 126 also has a portion for receiving the probe tip or needle 104, such as screw threads.

In order to provide sensitive adjustment according to the user's own touch, a thread and adjusting nut arrangement comprising threaded member 130 and spring tension adjusting nut 131 is provided at the upper end of the outer sleeve member 102. Also part of the adjustment feature is a spring 132, which may be formed of stainless steel, or other suitable material. The spring is telescoped over the vessel 100 until it rests against the spring retaining ring 120 attached to the side of vessel 100. In this position, the spring 120 is between the vessel 100 and outer sleeve member 102. The spring tension adjusting nut 131 is then threaded on member 130 and adjusted to compress spring 132 to the desired compressive force. The spring compression pushes vessel 100 and its contact block 112 firmly against contact block 126 of outer sleeve member 102, thus providing excellent thermal communication between the vessel 100 and probe tip 104. When it is desired to warm or raise the temperature of the probe tip or needle 104, it is merely necessary to move button 121 upward and to the left into locking slot 140. The probe in the locked open position is illustrated in FIG. 7. The button 121 is attached to vessel 100, thus when the user moves the button 121 upward against the pressure of spring 120, the whole vessel 100 with its supply of coolant is moved upward such that its contact block 112 is no longer in thermal communication with contact block 126 and probe tip 104. Simply moving button 121 sideways into slot 140 locks the probe in an open position, with spring 132 pushing button 121 against the lower portion of slot 140. The movement of button 121 from the position shown in FIG. 6 to the position shown in FIG. 7 can be readily and simply accomplished by finger tip control, and with the same hand that is handling the probe.

It should be noted that as the probe is moved from one position to the other, the outer sleeve member 102 and probe tip 104 remain stationary; only the vessel 100 containing the coolant moves, allowing the surgeon to move the vessel 100 into and out of thermal communication with the probe tip 104 at will, without disturbing the position of probe tip 104.

A cryogenic surgical probe constructed according to the teachings of this invention is highly accurate and has excellent reproducibility of tip temperature. To illustrate the accuracy and reproducibility of probe tip temperature, a thermocouple was embedded in the tip of a cryogenic probe constructed according to the embodiment of the invention shown in FIG. 1, and the temperature of the probe tip was recorded as the probe tip was attached to, and detached from the lens of an eye. The eye was maintained at a temperature of +40° C., to simulate body temperature.

FIG. 8 is a reproduction of the graph produced by the test, with the temperature of the probe tip, using liquid nitrogen as the coolant, reaching a steady state temperature of −40° C., as indicated at horizontal line 200. Contact of the probe tip with the eye lens was made at point 201, with the temperature of the probe tip rising slightly to point 202. The time required for the lens to freeze to the probe tip was just under one second. At point 204, electrically responsive heating means disposed in thermal communication with the probe-tip was energized, causing the temperature of the probe tip to rise rapidly, reaching 0° C. at point 206. The lens dropped from the probe tip of its own weight, with the total release time, from the time of energizing the heating means, being just under two seconds. The probe tip was then allowed to cool to −40° C. and the process repeated at 208 and 210, with the probe tip temperature, and adhesion and drop-off times being substantially the same as just described.

The cryogenic surgical probe described herein has many advantages. It it small, light and allows dexterous manipulation for delicate surgery, such as lens extraction in cataract surgery. It has a more than adequate self-contained supply of coolant, and means for rapidly warming the probe tip to cause objects which are attached thereto to be quickly loosened. The embodiment of the invention which electrically heats the probe tip requires only a small battery as its source of electrical potential, but it produces the required fast, accurate controlled results essential to successful surgery. The embodiment of the invention which mechanically separates the probe tip from the coolant means also provides fast, accurate control without the necessity of wires and battery. Further, the warming of the probe tip in both embodiments is controlled by the user by merely pressing a conveniently located pushbutton or slide button on the probe body, or in the case of the electrically heated probe tip, the switch may be in any other convenient location, such as a foot switch.

Since numerous changes may be made in the above-described application and different embodiments of the invention may be made without departing from the spirit thereof, it is intended that all matter contained in the foregoing description and shown in the accompanying drawings shall be interpreted as illustrative and not in a limiting sense.

We claim as our invention:

1. A surgical probe comprising a vessel having a chamber for containing coolant means, a sleeve member having an extended tip portion, said sleeve member telescoped over said vessel in sliding engagement, spring means, said spring means being disposed between said sleeve member and said vessel, urging said vessel into thermal communication with said extended tip portion, said extended tip portion being cooled to a predetermined temperature when coolant is added to said chamber, and means for sliding said vessel relative to said sleeve member, to overcome the urging effect of said spring means and cause thermal communication between said vessel and said extended tip portion to be interrupted when it is desired to raise the temperature of said extended tip portion.

2. A surgical probe comprising a vessel having thermally insulated walls and an uninsulated end, coolant means disposed in said vessel, a sleeve member telescoped over said vessel in sliding engagement, a probe tip attached to one end of said sleeve member, spring means, said spring means being disposed between said sleeve member and said vessel, urging the uninsulated end of said vessel into thermal communication with said probe tip, said probe tip being cooled to a predetermined temperature by said coolant means, and means for sliding said vessel relative to said sleeve member and overcome the urging effect of said spring means, interrupting the thermal communication between said vessel and said probe tip when it is desired to raise the temperature of said probe tip.

3. A surgical probe comprising an elongated vessel having thermally insulated walls and an uninsulated end; said uninsulated end forming a first thermal contact block; a sleeve member having one open end and a second thermal contact block on the other end; the open end of said sleeve member being telescoped over said vessel in sliding engagement, with the first and second thermal contact blocks in thermal communication; a probe tip; said probe tip disposed in thermal communication with said second thermal contact block causing said probe tip to be cooled to a predetermined temperature; spring means; said spring means disposed between said sleeve member and said vessel for maintaining a constant pressure between said first and second thermal contact blocks; and means for overcoming the pressure of said spring means causing said thermal contact blocks to separate when desired.

References Cited by the Examiner

UNITED STATES PATENTS

| 1,516,437 | 11/1924 | Humpoletz | 62—293 X |
| 2,645,097 | 1/1953 | Posch | 128—2 |

OTHER REFERENCES

Journal of the American Geriatrics Society, Cooper, 1961, vol. 9, pp. 714–718.

Journal of the American Medical Association, Cooper, 1962, pp. 600–605.

RICHARD A. GAUDET, *Primary Examiner.*

G. McNEIL, *Assistant Examiner.*